United States Patent
Grandidier et al.

(10) Patent No.: US 9,400,917 B2
(45) Date of Patent: Jul. 26, 2016

(54) REAL-TIME DYNAMIC REFERENCE IMAGE GENERATION FOR RANGE IMAGING SYSTEM

(75) Inventors: Frédéric Grandidier, Saint-Max (FR); Bruno Mirbach, Konz (DE); Thomas Solignac, Luttange (FR)

(73) Assignee: IEE International Electronics & Engineering S.A., Echternach (LU)

( * ) Notice: Subject to any disclaimer, the term of this patent is extended or adjusted under 35 U.S.C. 154(b) by 959 days.

(21) Appl. No.: 13/497,100

(22) PCT Filed: Sep. 16, 2010

(86) PCT No.: PCT/EP2010/063626
§ 371 (c)(1),
(2), (4) Date: May 30, 2012

(87) PCT Pub. No.: WO2011/036090
PCT Pub. Date: Mar. 31, 2011

(65) Prior Publication Data
US 2012/0229646 A1    Sep. 13, 2012

(30) Foreign Application Priority Data
Sep. 23, 2009 (EP) .................................. 09171117

(51) Int. Cl.
*H04N 7/18* (2006.01)
*H04N 5/232* (2006.01)
(Continued)

(52) U.S. Cl.
CPC ........ *G06K 9/00201* (2013.01); *G06K 9/00771* (2013.01); *G06T 7/2053* (2013.01); *G06K 2209/015* (2013.01); *G06T 2207/10028* (2013.01); *G06T 2207/30236* (2013.01)

(58) Field of Classification Search
CPC .......................... G06K 9/00624; G06T 7/0081
See application file for complete search history.

(56) References Cited

U.S. PATENT DOCUMENTS

| 5,953,076 A * | 9/1999 | Astle ..................... G06T 7/2033 348/580 |
| 2011/0013836 A1* | 1/2011 | Gefen ..................... G06T 7/204 382/171 |

FOREIGN PATENT DOCUMENTS

| EP | 0671706 A2 | 9/1995 |
| EP | 1152261 A1 | 11/2001 |

(Continued)

OTHER PUBLICATIONS

International Search Report for International application PCT/EP2010/063626; International Application Filing Date Sep. 16, 2010; Mail date Nov. 3, 2010.

(Continued)

*Primary Examiner* — William C Vaughn, Jr.
*Assistant Examiner* — Jerry Jean Baptiste
(74) *Attorney, Agent, or Firm* — Reising Ethington P.C.

(57) ABSTRACT

A dynamic reference range image generation method comprises providing a reference range image, to be dynamically updated, composed of pixels, each of which contains a reference range value. An acquired range image is provided, the pixels of which contain each a measured range value, the measured range values being updated at a predetermined rate. Pixels of the acquired range image containing an invalid measured range value are accordingly marked. The measured range value of each pixel of the acquired range image not marked as containing an invalid measured range value is compared with the reference range value of the corresponding pixel of the reference range image. The reference range value of that pixel of the reference range image is updated e.g. to the measured range value or to an average of the measured range value and one or more prior measured range values if a) the measured range value is considered less than the reference range value and has remained substantially constant for a first time period, or if b) the measured range value is considered greater than the reference range value and has remained substantially constant for a second time period smaller than the first time period. If neither of conditions a) and b) is fulfilled, the reference range value is kept substantially constant instead.

18 Claims, 3 Drawing Sheets

(51) Int. Cl.
*G06K 9/00* (2006.01)
*G06T 7/20* (2006.01)

(56) References Cited

FOREIGN PATENT DOCUMENTS

| WO | 9810255 A1 | 3/1998 |
|---|---|---|
| WO | 2006097406 A2 | 9/2006 |

OTHER PUBLICATIONS

Robert Langes doctoral thesis "3D Time-of-Flight Distance Measurement with Custom Solid-State Image Sensors in CMOS/CCD Technology" (Department of Electrical Engineering and Computer Science at University of Siegen) Submission Date Jun. 28, 2000; Date of Oral Examination Sep. 8, 2000.

B. Shoushtarian, "A practical approach to real-time dynamic background generation based on a temporal median filter", Journal of Sciences, Islamic Republic of Iran 14(4), 2003, pp. 351-362.

S. Bahadori, "Real-time people localization and tracking through fixed stereo vision", Applied Intelligence: The International Journal of ArtificialIntelligence, Neural Networks, and Complex problem-Solving TE, vol. 26, No. 2, Nov. 8, 2006, pp. 83-97, XP0194773383.

Shireen Y. Elhabian, "Moving Object Detection in Spatial Domain using Background Removal Techniques-State-of-Art", Recent Patents on Computer Science, Bentham Science Publishers, GB vol. 1, No. 1, Jan. 1, 2008, pp. 32-54, XP007905806.

AJO FOD "Laser-Based People Tracking" In. Proc. of the IEEE International Conference on Robotics and Automation (ICRA), 2002, pp. 3024-3029, XP002605742, Internet: URL: http://citeseerx.ist.psu.edu/viewdoc/summary?doi=10.1.1.16.1183.

Michael Harville, "Foreground Segmentation Using Adaptive Mixture Models in Color and Depth", Proceedings IEEE Workshop on Detection and Recognition of Events in Video, Jul. 8, 2001, pp. 3-11, XP008060089.

Rafael Munoz-Salinas, "People detection and tracking using stereo vision and color" Image abd Vision Computing 25 (2007) pp. 995-1007, XP022022927.

Written Opinion for International application PCT/EP2010/063626; International Application Filing Date Sep. 16, 2010.

\* cited by examiner

REAL-TIME DYNAMIC REFERENCE IMAGE GENERATION FOR RANGE IMAGING SYSTEM

TECHNICAL FIELD

The present invention generally relates to the field of computer vision, more particularly to dynamic reference image generation for a range imaging system.

BACKGROUND ART

Computer vision is the scientific discipline concerned with retrieving information from images. An important task in many computer vision applications is discriminating between objects of interest and background objects that are of no interest for the specific application. A well-known approach to address this problem is background subtraction, in which a reference image is subtracted from each input image in order to cancel all objects that are common to the input image and the reference image. This approach works well if the background, as recorded by the imaging system, remains constant, i.e. if the background contains no objects that are susceptible of entering, exiting or moving within the scene (such as e.g. a parked car in a traffic monitoring system) and if the lighting conditions remain the same (which is typically not the case for outdoor image sequences).

If the background may be subject to changes, measures have to be taken to dynamically update the reference image. In article "A practical approach to real-time dynamic background generation based on a temporal median filter" (by B. Shoushtarian et al., Journal of Sciences, Islamic Republic of Iran 14(4), 2003, pp. 351-362), the authors present a real-time dynamic background generation algorithm based upon a temporal median filter with exponentially weighted moving average (EWMA) filtering. The algorithm of this article uses a reference image, which is compared with an incoming image on a pixel-by-pixel basis. If the pixel value of a given pixel of the incoming images remains constant (within a tolerance range) for a certain time, it is assumed that the pixel value is part of the background and that value is copied to the reference image.

A range image is an image, wherein each pixel (image element) contains a range value corresponding to the distance from the imager system to the part of the scene imaged onto the specific pixel. The pixels of a reference range image contain reference range values. As in the case of 2D-imaging, background subtraction in range imaging is simple if the background of the scene is constant. In this case, a constant reference image of the empty scene can be used to remove the background. A problem of this approach is that the background of the scene has to stay constant over the life cycle of the computer vision system; otherwise the output of the system may be wrong. Whereas the assumption of constant background may be justified in laboratory or industrial environment, it is not generally applicable for systems installed in freely accessible areas.

BRIEF SUMMARY

This invention addresses the problem of variable image background by proposing a method for generating a dynamic reference range image.

According to the invention, the dynamic reference range image generation method comprises providing a reference range image, to be dynamically updated, composed of pixels, each of which contains a reference range value. An acquired range image is further provided, which is composed of pixels, each pixel of the acquired range image having a corresponding pixel in the reference range image and containing a measured range value, the measured range values being updated at a predetermined rate. In other words, it is assumed here that the acquired range image corresponds to the current frame. If there are pixels in the acquired range image that contain an invalid measured range value, such pixels are accordingly marked. The measured range value of each pixel of the acquired range image not marked as containing an invalid measured range value is compared with the reference range value of the corresponding pixel of the reference range image. The reference range value of that pixel of the reference range image is updated e.g. to the measured range value or to an average of the measured range value and one or more prior measured range values if a) the measured range value is considered less than the reference range value and has remained substantially constant for a first time period, or if b) the measured range value is considered greater than the reference range value and has remained substantially constant for a second time period smaller than the first time period.

If neither of conditions a) and b) is fulfilled, the reference range value is kept substantially constant instead.

As those skilled will appreciate, the method provides for different conditions for updating a pixel of the reference range image, depending on whether the measured range value of the corresponding pixel of the acquired image is less or greater than the stored reference range value. If the current measured range is smaller than the reference range, an object is present in the foreground of the scene. If the current measured range is larger than the reference range, an object that already belonged to the reference image has been removed. According to the method, the reference image is updated more quickly when a previously steady object disappears (causing a larger range to be measured in the corresponding pixels) than when an object appears (causing a smaller range to be measured in the corresponding pixels). The second time period, i.e. the waiting period for a reference range value to be updated in case of a measured range value greater than the reference range value, may be set below the frame period, so that the update is immediate in this case.

As the method provides for checking whether a pixel contains an invalid measured range value (which is common in range images if parts of the imaged scene have a large distance to the imager) and updates the corresponding reference pixel only if the measured range value is valid, the method is robust against introduction of measurement errors into the reference range image.

Preferably, the measured range value is considered less than the reference range value only if the reference range value exceeds the measured range value at least by a predefined tolerance value. Similarly, the measured range value is preferably considered greater than the reference range value only if the measured range value exceeds the reference range value at least by a predefined tolerance value. The tolerance values are preferably equal but they could also be distinct if deviations from the actual value are more likely and/or higher in the one direction than in the other.

Preferably, keeping the reference range value substantially constant if neither of conditions i.a) and i.b) is fulfilled comprises integrating (a contribution of) the measured range value into the reference range value if the measured range value is considered equal to (i.e. neither greater nor less than) the reference range value. The contribution of the measured range value is preferably selected using a predetermined filter, e.g. a moving average filter, a median filter or the like. As will be appreciated, this helps to reduce the noise on the reference range image.

The first time period and/or the second time period may be predefined as absolute time periods. Alternatively, they may be defined relative to another time period that can be determined during runtime. For instance, the first time period or the second time period may be selected equal to the (dynamically determined) time period, during which the measured range value had been considered equal to the reference range image before the first or the second time period, respectively, had started. This means that, if a measured range value remains substantially constant around a value different from the stored reference range value for a longer time than it had previously been equal to the stored reference value, the latter is updated to the current measured range value.

Preferably, for each pixel of the acquired range image marked as containing an invalid measured range value, the reference range value of the corresponding pixel of the reference image is updated to a maximum range value if the pixel has remained marked as containing an invalid measured range value for a third time period. In this variant of the method, pixels marked as containing an invalid measured range value are ignored unless they remain so marked for the third time period—in which case, the reference image pixel is updated to the maximum range value. The method third time period may be selected equal to one of a predetermined (absolute) time period and the (dynamically determined) time period during which the measured range value had been considered equal to the reference range image before the pixel of the acquired range image had been marked as containing an invalid measured range value. In a preferred variant of the method, the third time period is set equal, during runtime, to the shorter of a predetermined time period and the (dynamically determined) time period during which the measured range value had been considered equal to the reference range image before the pixel of the acquired range image had been marked as containing an invalid measured range value.

Those skilled will appreciate that the dynamic reference range image generation method may be used in a method of recognizing objects of interest within a range image, wherein a "background-free" range image is computed based upon the acquired range image and the reference range image and object recognition is carried out in the background-free image. The term "background-free" is intended to designate the image that corresponds to the acquired range image from which objects common to the reference range image and the acquired range image have been removed. "Background-free" is not intended to imply that only objects of interest are present in the background-free range image. To generate such background-free range image, the current acquired range image is preferably compared with the reference range image on a pixel-by-pixel basis. If the measured range value of a pixel is considered less than the reference range value of the corresponding pixel of the reference range image, that measured range value is kept in the corresponding pixel of the background-free range image. In the opposite case, the corresponding pixel of the background-free range image is marked as containing background, e.g. by setting the range value of that pixel to a default value. In other words, pixels containing the same or a higher range value in the acquired range image than in the reference range image are marked as background in the background-free range image and may be discarded in the subsequent image processing steps.

An aspect of the present invention concerns a computer program comprising instructions, which when the computer program is executed on a computer cause the computer to carry out the dynamic reference range image generation method and/or the method of recognizing objects of interest within a range image.

Another aspect of the present invention concerns a computer program product comprising a carrier medium carrying a program code with computer implementable instructions for causing a computer to carry out the dynamic reference range image generation method and/or the method of recognizing objects of interest within a range image. The carrier medium may comprise, e.g. permanent or a non-permanent memory, a storage drive, electromagnetic signals having the program code encoded therein according to a predefined protocol, etc.

Yet another aspect of the invention concerns a range camera comprising means for carrying out the dynamic reference range image generation method and/or the method of recognizing objects of interest within a range image. A preferred embodiment of this aspect of the invention concerns a traffic monitoring and/or control system, wherein one or more range cameras are arranged in (preferably elevated) positions so as to acquire range images of road users (e.g. cars, busses, trucks, bicycles, pedestrians, etc.), the system comprising means for carrying out the dynamic reference range image generation method and/or the method of recognizing objects of interest within the range images acquired by the one or more range cameras. Such means for carrying out the dynamic reference range image generation method and/or the method of recognizing objects of interest within a range image preferably comprise at least one of an application-specific integrated circuit, a field-programmable gate array, a digital signal processor and a computer program.

BRIEF DESCRIPTION OF THE DRAWINGS

A preferred embodiment of the invention will now be described, by way of example, with reference to the accompanying drawings in which.

DETAILED DESCRIPTION

Range images may be acquired by several acquisition techniques, using e.g. radar, acoustic or optic time-of-flight (TOF) measurements. For sake of illustration, a known optical TOF range imaging technique will be described with reference to FIG. 1.

Distance measurement by means of (visible, infrared or ultraviolet) light waves generally requires varying the intensity of the emitted light in time. The TOF method can e.g. be implemented using the phase-shift technique or the pulse technique. With the phase-shift technique, the amplitude of the emitted light is periodically modulated (e.g. by sinusoidal modulation) and the phase of the modulation at emission is compared to the phase of the modulation at reception. With the pulse technique, light is emitted in discrete pulses without the requirement of periodicity. In phase-shift measurements, the modulation period is typically in the order of twice the difference between the maximum measurement distance and the minimum measurement distance divided by the velocity of light. In this approach, the propagation time interval is determined as phase difference by means of a phase comparison between the emitted and the received light signal. Such phase comparison requires synchronization of the demodulation signal with the emitted light signal. Due to the high propagation speed given by the velocity of light, a fundamental difficulty encountered in distance measurements based on the pulse technique or the phase-shift technique resides in the required temporal resolution of the measurement device. In fact, a spatial resolution in the order of centimeters requires a temporal resolution in the order of $10^{-11}$ seconds (10 ps). The principles of range imaging based upon time-of-flight measurements are described in detail in EP 1 152 261 A1 (to Lange and Seitz) and WO 98/10255 (to Schwarte). An even more detailed description of the technique can be found in Robert Lange's doctoral thesis "3D Time-of-Flight Distance Measurement with Custom Solid-State Image Sensors in CMOS/CCD-Technology" (Department of Electrical Engineering and Computer Science at University of Siegen).

Figure 1:
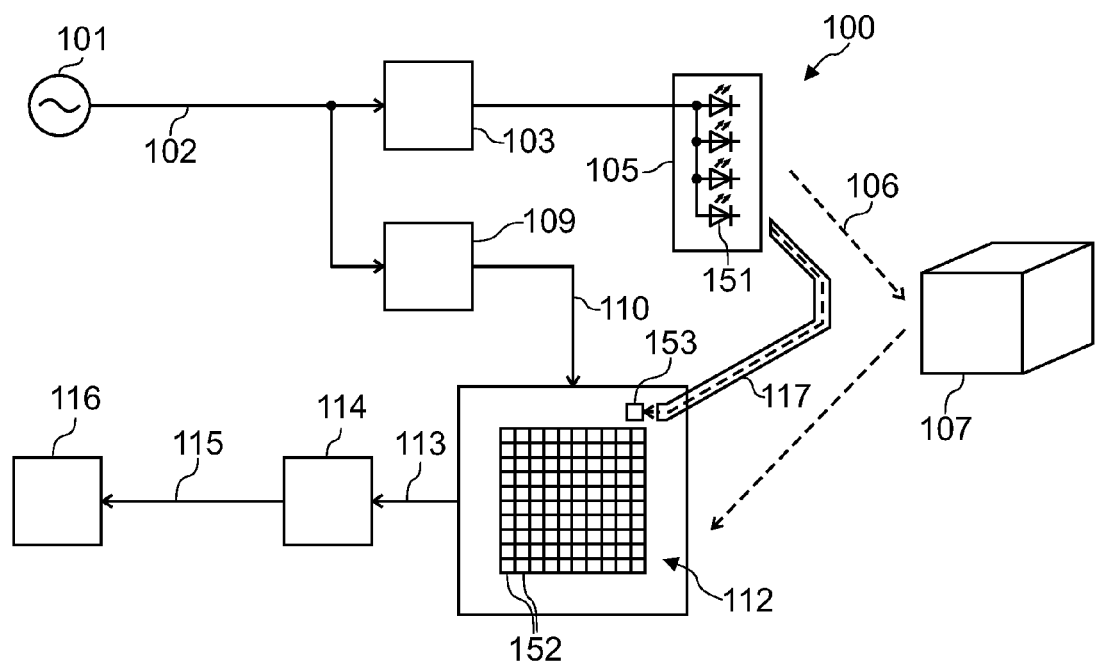
FIG. 1 is a schematic view of a 3D time-of-flight camera according to the prior art.

FIG. 1 depicts a range camera 100 according to the prior art (see e.g. WO 2006/097406 A2 for reference). Signal source 101 generates a modulation signal 102 on its output node. Illumination driver 103 amplifies the modulation signal to drive the illumination module 105 comprising several individual light emitting devices 151. The illumination module emits an intensity-modulated light wave 106, which is directed into the scene to be imaged. Object 107 in the scene scatters part of the light back onto the array 112 of lock-in pixel sensor cells 152 (hereinafter referred to as lock-in pixels, to shorten the notation). Each lock-in pixel 152 is at the same time fed with a demodulation signal 110, which is derived from the modulation signal 102 by the photo gate driver 109. Under the control of the demodulation signal 110, each lock-in pixel 152 integrates the charge generated therein by the impinging light during at least three time intervals, each of which corresponds to a different phase within one period of the modulation signal. Each lock-in pixel 152 provides response signals 113 indicating the integrated charge for the different time intervals. This raw phase information is sometimes referred to as "tap values" or "tap responses" according to the nomenclature of Robert Lange's doctoral thesis. To simplify computation of the phase difference between the received light and the modulation signal, one normally chooses four integration intervals corresponding to phases separated by 90°. For each pixel, one thus retrieves four tap values (called A0, A1, A2, A3) per picture taken. The tap values are converted into phase information 115 by the calculation unit 114. With four tap values, the phase difference $\phi$ is calculated as follows:

$$\phi = a\tan 2(A1-A3, A2-A0)$$

where a tan 2(x,y) is the four-quadrant inverse tangent function, yielding the angle between the positive x-axis of a plane and the point with coordinates (x, y) on that plane. For offset compensation, the range camera comprises a calibration lock-in pixel 153 receiving the modulated light from the illumination module 105 via a reference light path (provided by light guide 117). As the length of the reference light path is known, the phase difference computed with the tap responses from the reference lock-in pixel can be used to determine a global offset (i.e. common to all lock-in pixels). Phase drifts due to ageing of the illumination unit or to changing ambient temperature can thus be compensated. Calculation unit 114 is preferably a digital circuit, for example a digital ASIC (application specific integrated circuit) or an FPGA (field programmable gate array). Control unit 116, which is preferably a microcontroller, processes the distance information further to, for example, extract object characteristics. Further to the phase, $\phi$, calculation unit 116 calculates the modulation amplitude, A, of the reflected light and the non-modulated offset of the illumination, B:

$$A = \frac{1}{2}\sqrt{(A2-A0)^2 + (A3-A1)^2}$$

$$B = (A1+A2+A3+A4)/4$$

Mathematically, the light intensity received in a given lock-in pixel is thus given by the formula $$I(t) = B + A\sin(2\pi ft - \phi),$$

where f is the modulation frequency, and where it has been assumed that A and B remain substantially constant on the time scale of the modulation period. The phase $\phi$ may be regarded as a range value: if one is interested in expressing the range in metrical units, one may use:

$$r = \phi c/(2f),$$

with c being the speed of light.

Amplitude and background information is useful, for instance, to determine whether the calculated phase can be relied upon. A high ratio B/A indicates that only a small part of the light received in the pixel is modulated, i.e. stems from the illumination unit. A measured range value may thus be regarded invalid if the ratio B/A exceeds a predefined threshold.

Turning now to the description of a preferred embodiment of the method according to the invention, it is assumed that the acquired range images are composed of pixels, each of which contains a measured range value (e.g. expressed as a phase $\phi$, a metrical distance r, or in another convenient unit). Except for measurement errors, each measured range value corresponds to the radial distance from the imager to the part of the scene that is imaged onto the pixel concerned.

Any pixel containing an invalid range value is assumed to be marked accordingly. In the present embodiment the marking of a pixel is effected by replacing its deemed invalid range value by a predefined maximum range value, which may e.g. corresponds to the upper limit of the distance interval, in which unambiguous measurements can be carried out.

It is furthermore assumed that the background of the scene is generally static but may change as static objects are added to or removed from the scene.

The method generates a reference range image, each pixel of which contains a reference range value that corresponds, within the measurement accuracy, to the range limit of the scene background or, if the background objects are too remote from the imager, to the upper range limit of the imager. Whether an object is part of the background may depend on the application in which the method is used. Possible applications of range imaging system are, for instance, in traffic management. In a surveillance system of a parking lot, parking vehicles would not be considered as scene background, but as foreground objects to be detected. In a system for controlling traffic lights, however, parking vehicles should have no influence on the operation of the traffic lights and may thus be considered as part of the background of the scene.

If an object is added to the scene and remains static for at least a certain time interval, that object is considered to be part of the background, and the reference range image is updated in such a way that it incorporates the object as part of the background. If an object enters into the scene, the radial distances measured for the pixels on which this object is mapped will be shorter than the reference distances. As it is not a priori known if an object entering into the scene will stay steadily in the scene, the reference image cannot be updated immediately after the entrance of the object. The time after which an object is considered as static and thus as part of the background depends on the application and is, therefore, parameterizable. In the example of a traffic light control system this time could, e.g., be the maximum period of the traffic light system.

If a static object is removed from the scene, the reference image is updated more quickly than in the previous case. Where the object has been removed, the imager will measure higher range values, which are incorporated into the reference range image. At the moment when a static object is removed from the scene, the radial measured distances will be larger than the reference distances for those pixels, which this object was mapped on. In this case, the reference range value is preferably updated as fast as possible to the new, larger distance, since a non-static object entering the space previously occupied by the removed static object could otherwise be unintentionally ignore as long as the reference image is not updated. It may be worthwhile noting that dynamic background generation methods proposed for 2D vision systems always suffer from the drawback that a 2D vision system cannot distinguish between an object added and an object removed from the scene, at least not on pixel level. Such methods will thus always provide for the same time delay for updating the reference image irrespective of whether a static object has been added or removed.

The imager acquires in each frame a range image that can be expressed as a matrix $Im=(Im(i,j))_{i,j}$, where indices i and j designate the columns and the rows of pixels, respectively of the image. $Im(i,j)$ is the measured range value of the pixel at the intersection of column i and row j, unless the imager has determined that the measured range value is invalid. In this case $Im(i,j)$ is set equal to a value MAX_RANGE, which marks the pixel as containing an invalid range value. A measured range value is deemed invalid if it is too large to represent a reliable distance measurement (the threshold for regarding a measured range value too large may be selected according to the application, the type of imager and the location of the imager) or if the ratio B/A exceeds a predefined threshold.

The reference image is denoted as $Im_R=(Im_R(i,j))_{i,j}$. $Im_R(i,j)$ is the reference range value of the pixel at the intersection of column i and row j. It should be noted that the pixels could also be identified by means of a single index.

For dynamically updating the reference image $Im_R$, the following variables are introduced:

$(Im_S(i,j))_{i,j}$ is a transient reference image, with pixel values $Im_S(i,j)$;

$T_S(i,j)$ is the "transient counter", a counter (or timer) counting the number of consecutive frames in which the $Im(i,j)$ has been stable around the value $Im_S(i,j)$ of the corresponding pixel of the transient reference image;

$T_R(i,j)$ is the "reference counter", a counter (or timer) counting the number of consecutive frames in which $Im(i,j)$ has been stable around the value $Im_R(i,j)$ of the corresponding pixel of the reference range image;

$T_B(i,j)$ the "background counter", a counter (or timer) counting the number of consecutive frames in which $Im(i,j)$ has been equal to MAX_RANGE (i.e. in which the measured range value has been deemed invalid).

Together with these variables, the following customizable parameters are introduced:

N_IN the number of frames after which a reference range value $Im_R(i,j)$ of the reference range image is replaced by the value $Im_S(i,j)$ of the corresponding pixel in the transient reference image $Im_S$ if $Im_S(i,j)$ is considered less than $Im_R(i,j)$.

N_OUT the number of frames after which a reference range value $Im_R(i,j)$ of the reference range image is replaced by the value $Im_S(i,j)$ of the corresponding pixel in the transient reference image $Im_S$ if $Im_S(i,j)$ is considered greater than $Im_R(i,j)$. N_OUT is selected less than N_IN, so that the reference range value is updated more quickly when a static object leaves the scene than when such object enters the scene.

N_BG the number of frames after which a reference range value $Im_R(i,j)$ of the reference range image is replaced by the maximum range value MAX_RANGE if the measured range value has been deemed invalid.

Each of the following steps is performed individually for each pixel (i,j).

Step 1: Checking for stability of the pixel (i,j) measurement:

Step 1a: in case there is a reliable (valid) range measurement for pixel (i,j), the incoming measured range value $Im(i,j)$ is compared with the reference image $Im_R(i,j)$. If these two values are equal within some tolerance ±σ, counter $T_R(i,j)$ is incremented (by one unit), transient counter $T_S(i,j)$ is reset, and background counter $T_B(i,j)$ is also reset. The tolerance parameter σ can be chosen as a fixed value or a value depending on the measurement (i.e. the range value and/or the corresponding amplitude value) or on the frame counter value $T_R(i,j)$. If the incoming measured range value $Im(i,j)$ lies in the tolerance interval around the reference range value $Im_R(i,j)$, it is integrated into the reference image $Im_R(i,j)$ by some appropriate filter method, like a floating average or median. The counter $T_S(i,j)$ is reset.

Step 1b: As soon as the measured range value $Im(i,j)$ for pixel (i j) differs from the reference value by an amount greater than σ, a new transient pixel value $Im_S(i,j)$ is initialized with the incoming value $Im(i,j)$. If $Im(i,j)$ remains different from $Im_R(i,j)$ for the following frames, the range measurements are compared with the transient reference image. If the measurements $Im(i,j)$ are stable around the transient value $Im_S(i,j)$, the corresponding counter $T_S(i,j)$ is incremented. The measured range values are considered stable around the transient pixel value if they lie within a certain tolerance around the latter. The tolerance used can be the same as that in step 1a but could also be chosen different. As soon as a measured range value lies outside the tolerance interval around the transient pixel value $Im_S(i,j)$, the latter will be set equal to $Im(i,j)$.

Step 1c: If the measured range value $Im(i,j)$ is unreliable (invalid), counter $T_B(i,j)$ is incremented, else reset.

Step 2: Updating the reference images

Step 2a: If the incoming measured range value $Im(i,j)$ lies in the tolerance interval around the transient pixel value $Im_S(i,j)$, it is integrated into the transient pixel value $Im_S(i,j)$ by some appropriate filter method, like a floating average or median.

Step 2b: If the transient counter $T_S(i,j)$ is large enough, the reference range value $Im_R(i,j)$ and its counter $T_R(i,j)$ are set equal to the transient pixel value $Im_S(i,j)$ and transient counter $T_S(i,j)$, respectively. Counter $T_S(i,j)$ being large enough means that either it is greater than the customizable parameter N_IN if the transient pixel value $Im_S(i,j)$ is less than $Im_R(i,j)$ (a new object entered the scene) or it is greater than N_OUT if the transient pixel value value $Im_S(i,j)$ is greater than $Im_R(i,j)$ (an object left the scene).

Step 2c: If the incoming measured range value $Im(i,j)$ is unreliable (invalid) and counter $T_B(i,j)$ is greater than the customizable parameter N_BG, the reference range value Im$_R${i,j} is set to the maximum range value MAX_RANGE, its associated counter T$_R$(i,j) is set equal to the value of T$_B$(i,j) and counter T$_S$(i,j) is reset.

Instead of comparing counters T$_B$(i,j) and T$_S$(i,j) in step 2b and 2c with fixed thresholds, one might also introduce a relative condition on the counters, e.g. compare them with counter T$_R$(i,j). The condition for setting the reference range value to the maximum range value (step 2c) could e.g. be: T$_B$(i,j)>N_BG or T$_B$(i,j)>T$_R$(i,j).

As steps 1a, 1b, 2a and 2b are only performed in case of a reliable measured range value, non-reliable measurements are ignored, unless they persist in a given pixel (i,j) for a time period larger than N_BG (step 2c).

Choosing different values for the first and second time periods (time thresholds N_IN and N_OUT) allows updating a reference range value faster to a higher value than to a lower one. By appropriately choosing N_OUT and N_IN, a reference range value can be immediately reset to higher values, whereas a certain waiting time is necessary before a new static object is integrated into the reference range image as part of the background.

According to step 1b, a transient pixel value is reset whenever a reliable incoming measured range value deviates from the transient pixel value. In this way it is guaranteed that non-static objects are not considered as part of the background and instead the reference range value stays unchanged.

Integrating an incoming measured range value into the reference range value by an appropriate filter method as in steps 2a and 2b may be omitted. However, by taking into account contributions from several consecutive measured range values instead of a single one, one increase the accuracy of the reference range value, as noise is filtered out. In this way, the reference range image will be the more accurate, the longer the dynamic reference image generation runs.

In the following, the preferred embodiment of the method as described before is summarized in pseudocode:

```
/* Check for each pixei (i,j) stability of range measurement */
1 IF Im(i,j) ≠ MAX_RANGE /* Case of a reliable range measurement
     value */
2   IF   Im_R(i,j)–σ ≤ Im(i,j) ≤ Im_R(i,j)+σ
                    /* New value corresponds to reference value */
3       T_R(i,j) = T_R(i,j)+1      /* Increment reference counter */
4       Integrate Im(i,j) into Im_R(i,j)
5       T_s(i,j) = 0
6   ELSE               /* Outside reference image range */
7       IF      Im_s(i,j)–σ ≤ Im(i,j) ≤ Im_s(i,j)+σ
                    /* Inside transient reference image range */
8           T_s(i,j) = Ts(i,j)+1   /* Increment transient counter */
9           Integrate Im(i,j) into Im_s(i,j)
10      ELSE           /* Outside transient reference image range */
11          Im_s(i,j) = Im(i,j) /* Initiate new transient reference
                image */
12          T_s(i,j) = 1
13  T_B(i,j) = 0            /* Reset background counter */
14 ELSE                /* Case of a non-reliable range measurement value */
15  T_B(i,j)=T_B(i,j)+1    /*Increment background counter */
/* Update Reference Image Value by Transient Value */
16 IF ((Im_s(i,j) < Im_R(i,j)) AND (T_s(i,j) > N_IN))
17   OR((Im_s(i,j) > Im_R(i,j)) AND (T_s(i,j) > N_OUT))
18      Im_R(i,j) = Im_s(i,j)
19      T_R(i,j) = T_s(i,j)
20      T_s(i,j) = 0
/* Update Reference Image Value by Maximum Range Value */
21 IF ((T_B(i,j) > T_R(i,j)) OR (T_B(i,j) > N_BG))
22      Im_R(i,j) = MAX_RANGE
23      T_R(i,j) = T_B(i,j)
24      Reset Im_s(i,j)
25      T_s(i,j) = 0
```

The value of N_IN (i.e. the first time period) may be determined at runtime. For instance, at system startup, N_IN could be initialized at a low value and then kept equal to the historical high of T$_R$(i,j) until a maximum value N_IN$_{max}$ is reached, i.e. for each frame, N_IN could be set to min(N_IN$_{max}$, max (N_IN, T$_R$(i,j))). Alternatively, N_IN could also be caused to increase linearly with time since startup, until the maximum value N_IN$_{max}$ is reached. The value of N_OUT (i.e. the second time period) is preferably selected as a predetermined absolute number of frames.

Figure 2:
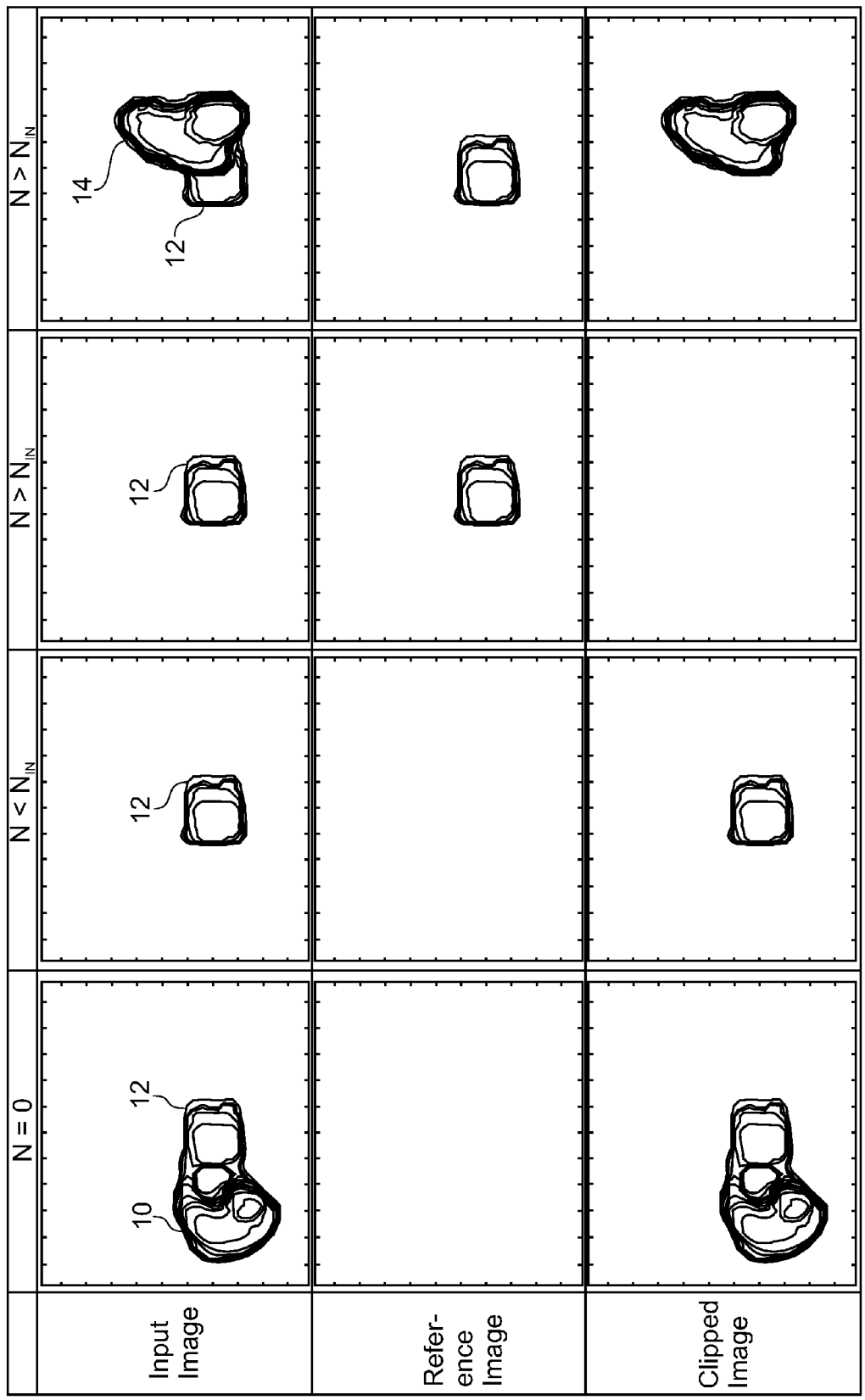
FIG. 2 shows a sequence of frames illustrating the updating of the reference range image if a static object is put into the field of view of a range imager.

FIG. 2 illustrates the evolution in time of the acquired range image (top row), the reference range image (middle row) and the background-free range image obtained by setting pixels having the same value in the reference range image and the acquired range image to the maximum range value (bottom row), when a static object is put into the scene being monitored. N denotes the frame number, which grows from the left to the right. The images show a room monitored from above (the imager is fixed at the ceiling and is oriented perpendicular to the floor, which is represented by the white background in each image). The contours correspond to sets of points that are equidistant from the imager. The innermost contours are the closest to the imager. At frame 0, a person 10 places a static object 12 in form of a box in the middle of the scene. The person 10 then leaves the scene while object 12 remains immobile during a certain time. The reference range image is initialized at N=0 as shown in the first frame of the middle row. While N<N_IN (1$^{st}$ and 2$^{nd}$ columns), the reference range image does not change. After object 12 has remained immobile for more than N_IN frames, the reference range image is updated. For later times (last column), object 12 is considered to form part of the background, thereby facilitating recognition of a person 14 in the field of view of the imager.

Figure 3:
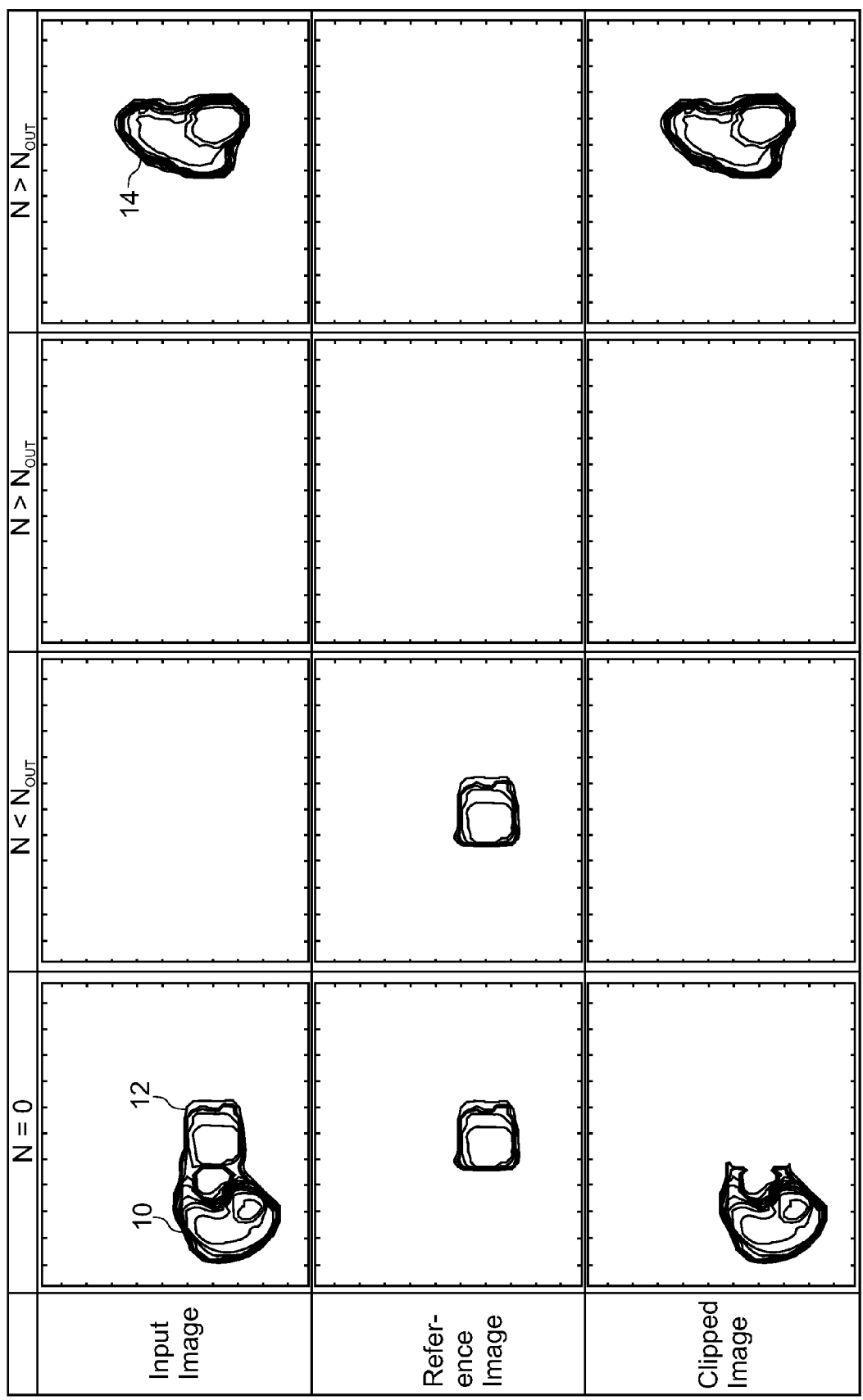
FIG. 3 shows a sequence of frames illustrating the updating of the reference range image if the static object is taken out of the field of view of the range imager.

FIG. 3 illustrates the evolution in time of the acquired range image (top row), the reference range image (middle row) and the background-free range image (bottom row) subsequently to the situation of FIG. 2. N=0 in FIG. 3 corresponds to a frame number above N_IN in FIG. 2. At N=0, the object 12 is removed from the scene by person 10. The imager now measures greater range values in the area previously occupied by object 12. The reference range image is updated as soon as N>N_OUT (3$^{rd}$ and 4$^{th}$ columns in FIG. 3).

The method can run in parallel to any other application, thus dynamically updating the reference range image for each frame (the predefined rate at which the method operates corresponds in this case to the frame rate of the imager). Alternatively, the reference range image update could run periodically at any period longer than the image acquisition period, e.g. to reduce the computational effort. For scenes where the background is not expected to change over time, the invention can also be used to create a reference range image on system setup or at service maintenance by running it for a short time (e.g. a few minutes) of several frames. The larger that number of frames is, the more accurate the reference range image will be. In these cases the benefit of the invention is that a correct reference range image can be generated even in situations where objects or persons are moving through the scene during reference range image generation.

Figure 4:
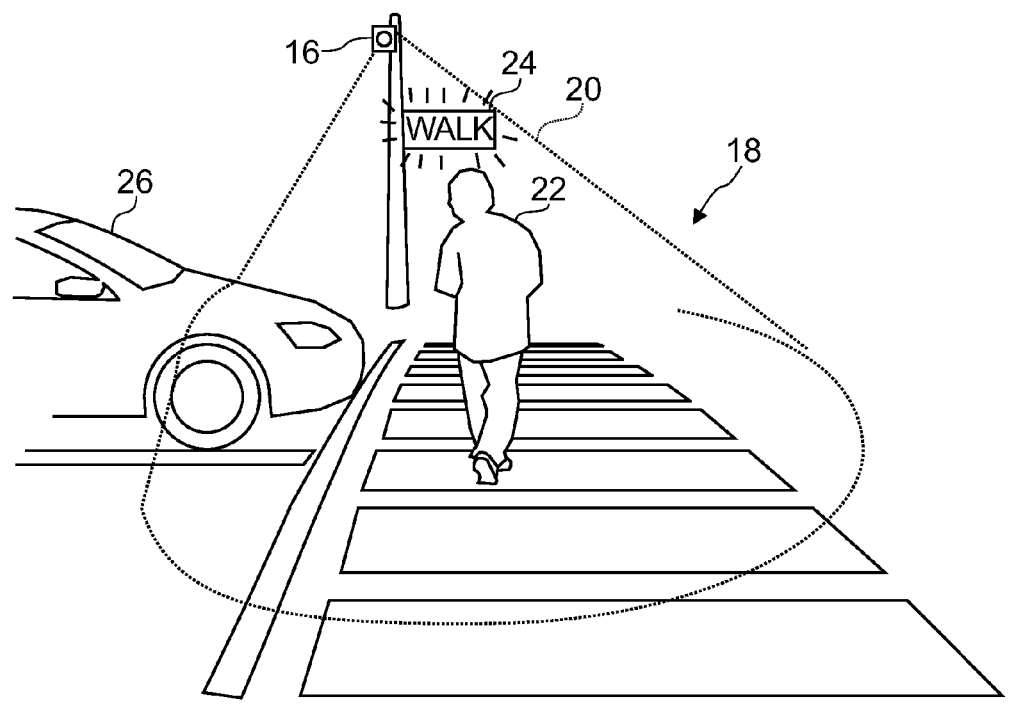
FIG. 4 is a schematic drawing of a traffic monitoring an control system according to an aspect of the present invention.

FIG. 4 shows a traffic monitoring and control system comprising a range camera 16 arranged in an elevated position above a crosswalk 18. The range camera is arranged in such a way that the crosswalk 18 lies in its field of view 20. The range images acquired by range camera 16 are transmitted to a central control unit (not shown) that processes the range images. The central control unit is configured to carry out the dynamic reference range image generation as described hereinbefore and to recognize pedestrians 22 on the crosswalk 18 or waiting at pedestrian light 24. If pedestrians are waiting at the crosswalk, this is interpreted by the system as a request for the pedestrian light to switch to the "walk" sign. Objects, such as e.g. parked car 26, which remain immobile within the field of view of range camera 16 for the predetermined first time period (expressed e.g. as N_IN) cause the reference range image kept in memory by the system to be updated. Static objects are thus eliminated in the background-free images, which facilitates recognition of objects of interest (moving vehicles, vehicles stopped for short times only, pedestrians, etc.) If a static object leaves the field of view of the range camera, the reference image is updated more quickly in order assure that the correct background is used for subtraction in case another road user occupies the space previously occupied by the static object. For the present application, the first time period is preferably chosen greater than the maximum period (the duration of the longest possible cycle) of the traffic lights—as it is highly improbable that an object of interest remains immobile for that time. If, for instance, the period of the traffic light system is two minutes, every potentially interesting road user may be assumed to have moved in this time period. Choosing the time interval during which an object has to remain static in order to appear in the reference image longer than two minutes thus guarantees that traffic participants are not considered as part of the background.

The invention claimed is:

1. A method of generating a dynamic reference range image, comprising
    generating the dynamic reference range image composed of pixels, each of which contains a reference range value that identifies an intensity of detected light;
    generating an acquired range image composed of pixels, each pixel of said acquired range image having a corresponding pixel in said dynamic reference range image and containing a measured range value, said measured range values being updated at a predetermined frame rate;
    marking the pixels of said acquired range image containing an invalid measured range value;
    comparing the measured range value of each pixel of said acquired range image not marked with the reference range value of the corresponding pixel of said dynamic reference range image;
    adding a first object to said dynamic reference range image when the comparing determines that said measured range value is considered less than said reference range value and has remained constant for a first time period; and
    removing a static object of said dynamic reference range image when the comparing determines that said measured range value is considered greater than said reference range value and has remained constant for a second time period smaller than said first time period.

2. The method according to claim 1, further comprising updating said reference range value to one of said measured range value and an average of said measured range value and one or more prior measured range values.

3. The method according to claim 1, wherein said measured range value is considered less than said reference range value if said reference range value exceeds said measured range value at least by a predefined tolerance value.

4. The method according to claim 1, wherein said measured range value is considered greater than said reference range value if said measured range value exceeds said reference range value at least by a predefined tolerance value.

5. The method according to claim 1, further comprising integrating a contribution of said measured range value into said reference range value if said measured range value is considered neither greater nor less than said reference range value,
    wherein said contribution of said measured range value is determined using a predetermined filter.

6. The method according to claim 1, wherein said first time period or said second time period is predefined as an absolute time period.

7. The method according to claim 1, wherein said first time period or said second time period is set equal to a time period during which said measured range value had been considered neither greater nor less than the dynamic reference range image before said first or said second time period, respectively, had started.

8. The method according to claim 1, comprising, for each pixel of said acquired range image marked as containing an invalid measured range value, updating the reference range value of the corresponding pixel of the reference image to a maximum range value if said pixel has remained marked as containing an invalid measured range value for a third time period.

9. The method according to claim 8, wherein said third time period is set equal to one of a predetermined time period and the time period during which said measured range value had been considered neither greater nor less than the dynamic reference range image before said pixel of the acquired range image had been marked as containing an invalid measured range value.

10. The method according to claim 8, wherein said third time period is set equal to the shorter of a predetermined time period and the time period during which said measured range value had been considered neither greater nor less than the dynamic reference range image before said pixel of the acquired range image had been marked as containing an invalid measured range value.

11. A method of recognizing objects of interest within a range image, said method comprising:
    generating a dynamic reference image in accordance with the method of claim 1;
    computing a background-free range image based upon said acquired range image and said dynamic reference range image; and
    proceeding to object recognition in said background-free image.

12. Computer program comprising instructions for generating dynamic reference range image, the instructions stored on a non-transitory computer readable medium, which when executed by a computer cause said computer
    to generate the dynamic reference range image composed of pixels, each of which contains a reference range value that identifies an intensity of detected light;
    to generate an acquired range image composed of pixels, each pixel of said acquired range image having a corresponding pixel in said dynamic reference range image and containing a measured range value, said measured range values being updated at a predetermined frame rate;
    to mark the pixels of said acquired range image containing an invalid measured range value;
    to compare the measured range value of each pixel of said acquired range image not marked with the reference range value of the corresponding pixel of said dynamic reference range image;
    to add a first object to said dynamic reference range image when the comparing determines that said measured range value is considered less than said reference range value and has remained constant for a first time period; and to remove a static object of said dynamic reference range image when the comparing determines that said measured range value is considered greater than said reference range value and has remained constant for a second time period smaller than said first time period.

13. A range camera comprising a processor and a memory, the memory storing computer executable code for generating a dynamic reference range image that when executed by the processor causes the range camera to:

generate the dynamic reference range image composed of pixels, each of which contains a reference range value that identifies an intensity of detected light;

generate an acquired range image composed of pixels, each pixel of said acquired range image having a corresponding pixel in said dynamic reference range image and containing a measured range value, said measured range values being updated at a predetermined frame rate;

mark pixels of said acquired range image containing an invalid measured range value;

compare the measured range value of each pixel of said acquired range image not marked with the reference range value of the corresponding pixel of said dynamic reference range image;

add a first object to said dynamic reference range image when the comparing determines that said measured range value is considered less than said reference range value and has remained constant for a first time period; and remove a static object of said dynamic reference range image when the comparing determines that said measured range value is considered greater than said reference range value and has remained constant for a second time period smaller than said first time period.

14. A traffic system, comprising
one or more range cameras arranged in positions selected such that said range cameras are able to acquire range images of road users, said one or more cameras configured to:

generating an acquired range image composed of pixels, each pixel of said acquired range image containing a measured range value, said measured range values being updated at a predetermined frame rate, and marking pixels of said acquired range image containing an invalid measured range value; and the traffic system configured to generate a dynamic reference range image composed of pixels, each of which contains a reference range value that identifies an intensity of detected light, each pixel of said reference range corresponding to a pixel of said acquired range image, compare the measured range value of each pixel of said acquired range image not marked with the reference range value of the corresponding pixel of said dynamic reference range image, add a first object to said dynamic reference range image when the comparing determines that said measured range value is considered less than said reference range value and has remained constant for a first time period, and remove a static object of said dynamic reference range image when the comparing determines that said measured range value is considered greater than said reference range value and has remained constant for a second time period smaller than said first time period.

15. The method according to claim 1, wherein the reference range value corresponds, within a measurement accuracy, to a range limit.

16. The method according to claim 1, wherein the measured range value corresponds to a radial distance from an imager to a part of a scene that is imaged onto each pixel of said acquired range image.

17. The method according to claim 1, wherein radial distances of the measured range values for the pixels on which the first object is mapped are shorter than reference distances of the dynamic reference range image.

18. The method according to claim 1, wherein radial distances of the measured range values for the pixels from which the static object is removed are larger than reference distances of the dynamic reference range image.

* * * * *